United States Patent
Heck (10) Patent No.: US 7,809,664 B2
(45) Date of Patent: Oct. 5, 2010

(54) AUTOMATED LEARNING FROM A QUESTION AND ANSWERING NETWORK OF HUMANS

(75) Inventor: Larry P. Heck, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 374 days.

(21) Appl. No.: 11/962,766

(22) Filed: Dec. 21, 2007

(65) Prior Publication Data

US 2009/0162824 A1 Jun. 25, 2009

(51) Int. Cl.
- G06F 17/28 (2006.01)
- G06F 17/30 (2006.01)
- G06N 5/02 (2006.01)

(52) U.S. Cl. .......................... 706/46; 707/748; 704/10; 709/204

(58) Field of Classification Search .............. 704/7, 704/10; 706/45, 46, 48; 707/3–6, 706, 721, 707/751, 999.003, 999.004, 999.005, 999.006, 707/739, 748; 709/204

See application file for complete search history.

(56) References Cited

U.S. PATENT DOCUMENTS

| | | | | |
|---|---|---|---|---|
| 5,519,608 A | * | 5/1996 | Kupiec | 704/9 |
| 6,064,978 A | * | 5/2000 | Gardner et al. | 705/10 |
| 6,584,470 B2 | * | 6/2003 | Veale | 707/102 |
| 6,615,111 B2 | * | 9/2003 | Tackett et al. | 700/246 |
| 2002/0128818 A1 | | 9/2002 | Ho et al. | |
| 2003/0163356 A1 | * | 8/2003 | Marks et al. | 705/7 |
| 2006/0287907 A1 | | 12/2006 | Kim | |

OTHER PUBLICATIONS

"Brainboost" downloaded from the Internet on Feb. 26, 2008 < http://en.wikipedia.org/wiki/Brainboost > 1 page.

* cited by examiner

*Primary Examiner*—James Trujillo
*Assistant Examiner*—Jorge A Casanova
(74) *Attorney, Agent, or Firm*—Hickman Palermo Truong & Becker LLP (57) ABSTRACT

A QA robot learns how to answer questions by observing human interaction over online social networks. The QA robot observes the way people ask questions and how other users respond to those questions. In addition, the QA robot observes which questions are most helpful and analyzes those questions to identify the characteristics of those questions that are most helpful. The QA robot then uses those observations to enhance the way it answers questions in the future.

22 Claims, 3 Drawing Sheets

AUTOMATED LEARNING FROM A QUESTION AND ANSWERING NETWORK OF HUMANS

BACKGROUND

A variety of mechanisms are available to help users search and find electronic information. For example, many electronic resources employ search engines to help users locate information. Some search engines even include automated question and answer systems ("QA robots") that are designed to identify keyword strings that can be interpreted as questions. Instead of returning a list of ranked search results, a QA robot returns predetermined answers to known questions.

Much of the prior work in building QA robots has been conducted in academic environments and research labs. One organization involved in developing QA robots is the NIST (National institute of Standards & Technology). The NIST sponsors TREC (Text Retrieval Conference) to promote the QA robot development effort. The NIST TREC efforts have influenced to a large extent much of the QA robot design endeavors.

A basic approach for designing a QA robot is to create and store a set of static responses that can be retrieved by the QA robot in response to well-defined queries. In other words, a QA robot retrieves answers from a database that stores a set of questions with predetermined answers. For example, a QA robot may be asked (e.g., through a keyword string) to find movies James Dean has appeared in. The QA robot consults its database, and, assuming the QA robot has information stored about James Dean movies, it retrieves the answer (e.g., James Dean has appeared in "East of Eden", "Fixed Bayonet", "Giant", and "Rebel Without a Cause"). The answer is then displayed to the user. Note that when a question is submitted to the QA robot, the QA robot may first check to see how closely the question's keywords relate to the actual questions stored in the QA robot's database. If it finds a close match, the QA robot retrieves the answer. In this way, a user can find electronic answers to questions, not just ranked results.

One of the problems with conventional QA robots is that they are only as smart as the information stored in its database. Unfortunately, the information accessible to QA robots is typically static. Hence, if a question is posed that is not in the QA robot's database, the QA robot cannot respond to it.

Another problem with current QA robots is that they are built on the basis of a body of knowledge that is informational in character (e.g., the type of information found in an encyclopedia or dictionary). QA robots cannot answer more subjective questions like "what is the best cheese cake restaurant in New York City?", "what is the best movie to see?", and other questions that are subjective in nature.

In addition, QA robots cannot answer questions that are of a localized nature (e.g., the type of information that cannot be found in a book). For example, suppose a person is flying to Boise, Id. and wants to take a shower and freshen up upon his arrival. However, this person does not want to stay check-in and stay overnight in a hotel. This information may be difficult to find by performing standard web searches, but it is the type of question that a resident of Boise may be able to answer. Yet, QA robots do not have this type of localized information, nor do they have the capability to find this type of information out.

Another problem with, QA robots is that to train a QA robot to answer questions effectively takes time and large amounts of training data (e.g., to find out what answers are effective, what answers are more useful, which answers are correct, etc.). Moreover, current training approaches are non-adaptive, meaning once a question has an answer in a QA robot database it is difficult to change (e.g., an answer is presumed correct until it is manually changed).

Finally, perhaps the biggest problem with conventional QA robots is that they are often wrong, and users do not like wrong answers. In fact, users often find it much easier to perform a search query in a search engine to find information rather than using the QA robots. Especially since the way users search for answers in a QA robot is not much different than the way they search with keywords (e.g., questions submitted to QA robots are often not natural language queries). Thus, current QA technology cannot match users' demands.

The approaches described in the section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of embodiments of the present invention. It will be apparent, however, that the present invention may be practiced without these specific details. In other instances, well-known structures and devices are shown in block diagram form in order to avoid unnecessarily obscuring embodiments of the present invention.

Functional Overview

A QA robot learns how to answer questions by observing human interaction over online social networks. The QA robot observes the way people ask questions and how other users respond to those questions. In one embodiment, the QA robot observes which questions are most helpful and analyzes those questions to identify the characteristics of those questions that are most helpful. The QA robot then uses those observations to enhance the way questions are asked and answered in the future.

In this way, a QA robot can use good answers as templates to respond to similar questions. By observing human interaction, the QA robot can enlarge its database of answers, refine which questions it chooses to answer, and refine the way it answers the questions.

Web-Based Environment

Even though the techniques and tools described herein are described in terms of an Internet or Web-based environment, these environments are meant only to serve as exemplary environments in which the techniques of the present invention are employed. In alternative implementations, the techniques may be employed in other environments. For example, the techniques could be employed by an application, in a desktop search environment, a document editor, and other environments.

Example Search Engine

In addition, many of the techniques and tools described herein are discussed in connection with a search engine. In one embodiment, a search engine is a web search engine. The search engine executes search queries and generates search results using indexes to find related references, links, and other information stored in connected repositories. In one embodiment, the search engine also implements a QA robot. Moreover, the search engine includes software tools that capture questions and forwards those questions to the QA robot.

For example, suppose a user submits a question to a search engine that asks "who is John Doe?" In one embodiment, the search engine receives the question and forwards it to the QA robot.

Example QA Robot

Many search portals, message boards, chat rooms, and other web sites (collectively called "social networks") provide users with the ability to post questions to other users of the same site. Often, users with a particular expertise in the subject matter being discussed post responses to those questions. In one embodiment, a QA robot includes software tools to analyze questions submitted by users, to find the most "correct" answer to the questions, and to display the answers to the users.

In order to determine the most correct answer to a question (e.g., the answer that is most likely to satisfy the user who posted the question), the QA robot includes tools to observe the way people ask questions and how other users respond to those questions. The QA robot observes which questions are most helpful and uses those observations to enhance the way it responds to future questions. In one embodiment, the QA robot may use good answers as templates to respond to similar questions. By observing the human interaction, the QA robot can enlarge its database of answers, refine which questions it chooses to answer, and refine the way it answer the questions.

Figure 1:
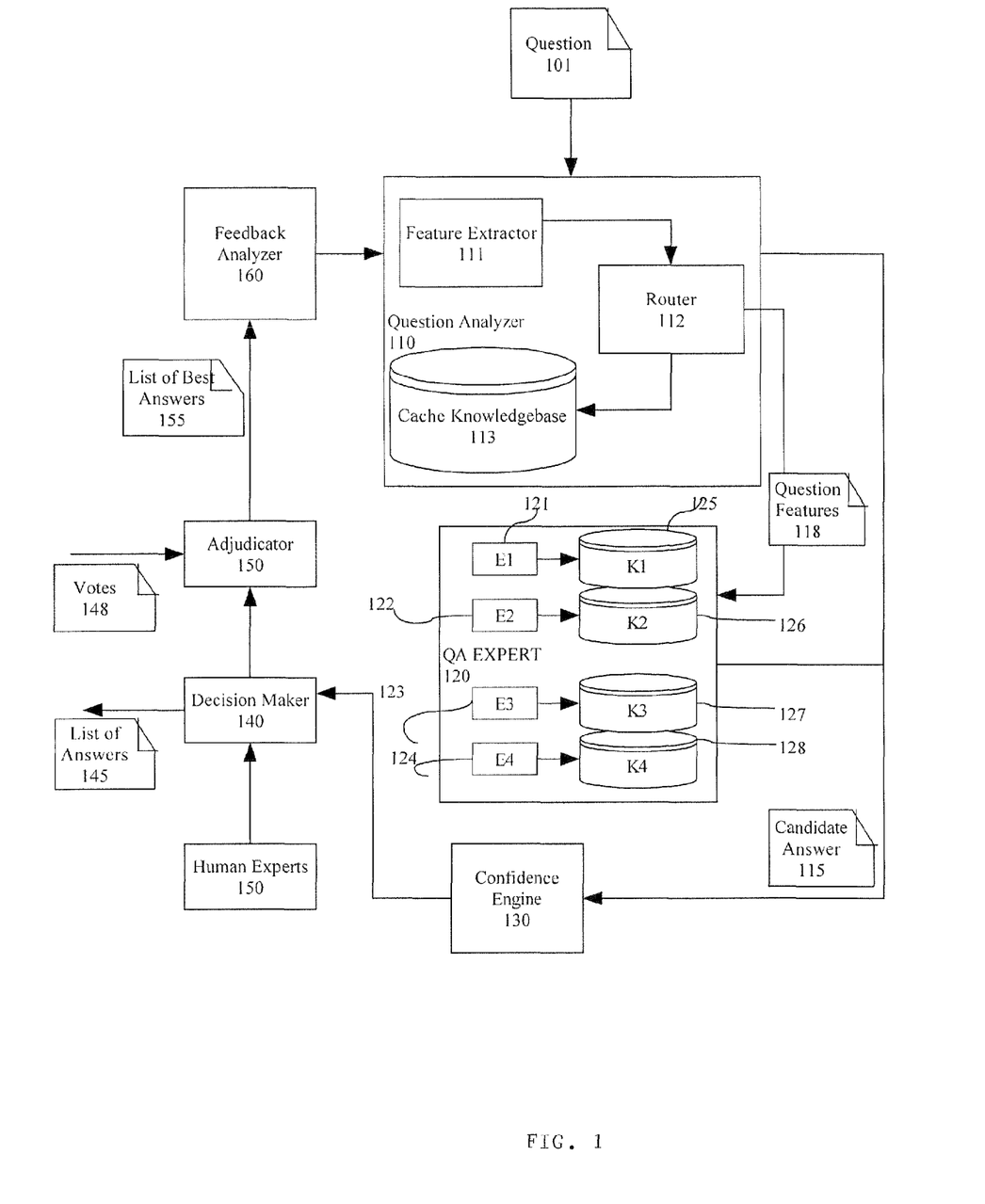
FIG. 1 illustrates a block diagram of an example system for learning from a question and answering network of humans, according to an embodiment of the invention.

FIG. 1 illustrates an exemplary QA robot system 100 for receiving questions, generating answers to those questions, and displaying the answers to the users. Moreover, system 100 also collects feedback on its answers and uses that feedback to refine its ability to answer subsequent questions. System 100, in one embodiment, includes question analyzer 110, QA answer component 120, confidence engine 130, decision maker 140, adjudicator 150, and feedback analyzer 160. In other embodiments, system 100 may include a different set of tools and components. Each of the components of system 100 is discussed below, but first a few commonly used terms are discussed.

Questions

A "question" as used herein is a query submitted by a user to a QA robot. In one embodiment, the question can be in a natural language format, (e.g., the format a person would typically ask a question). Example questions include "what is your name?", "why is the sky blue?", "how many teeth does a shark have?", etc. In other embodiments, a question can be a keyword string, like a search query (e.g., "movies+'James Dean'"). Questions can include requests for a wide variety of data. Some of the types of data a question may request include: (1) informational data, (2) subjective information, (3) localized information, (4) timely information, and (5) search engine data. In other embodiments, questions may request other types of data.

Informational Data

"Informational data" generally refers to the type of information that is based on fact. It includes, but is not limited to, the type of information found in newspapers, dictionaries, phonebooks, atlases, encyclopedias, almanacs, textbooks, and other such sources of information. Examples of informational data include the distance between the earth and the sun (e.g., ~93,000,000 miles), the first man to walk on the moon (Neil Armstrong), how many home runs Roger Maris hit in 1961 (61), the definition of the word "pulchritudinous", and other such information.

Subjective Information

"Subjective information" refers to information that is based more on opinion than fact. It includes information where people have reasonable disagreements about a "correct" answer. Examples of subjective information include movie reviews, restaurants critiques, discussions about which baseball player is the greatest of all-time, and other such information.

Localized Information

"Localized information" generally refers to information that is not generally known outside of a particular geographic location. Examples of localized information include information related to a city's bus schedule may not be readily available online, information about high traffic areas, police speed traps, whether a particular bridge is out, which parks have tennis courts, and other such information.

Timely Information

"Timely information" refers to time-sensitive and time-critical data. For example, suppose a user's favorite celebrity passes away or favorite politician is arrested for a crime. That type of information may not be immediately reported through mainstream news sources (e.g., television, newspapers, or radio). In one embodiment, the QA robot may be able to provide that information, since often information is put out on the Internet before other sources.

Search Engine Data

"Search engine data" generally refers to any information generated and indexed by a search engine. It includes documents, applications, downloads, and other types of web page information. Search engine data can also include static abstracts, active abstracts, additional links related to a particular web pages, search results based on search queries, related topics and keywords, other suggested queries, and other such information. In addition, search engine data can include metadata about a page (e.g., publisher, date, author, tags, text from a web page, etc.).

In one embodiment, search engine data includes feed-based data (e.g., information submitted to a search engine by a web page publisher or advertiser). The feed-based data can include links to product reviews, catalogs, promotional offers, and other information available online.

Answers

"Answers" as used herein refers to the information that is presented to a user in response to a question. Answers can consist of the types of information described above. Answers are derived by a QA robot in a variety of ways.

One way to teach the QA robot how to answer questions is to boot it into an initial training mode. According to one embodiment, the QA robot can then be populated with test questions and answers, archived questions and answers from a social network, and information from other sources. The QA robot uses those sources of information to learn. For example, a social network may already have archives of questions and answers that can be fed to the QA robot. In one embodiment, the QA robot stores the questions and their associated answers directly into its knowledgebase and retrieves that information when similar questions are subsequently asked. In one embodiment, this training may be supervised by people to ensure that the answers to a question are correct and that answers are being stored and indexed properly.

Another approach QA robot may use to learn how to generate answers to questions is to observe users (particularly expert users) as they respond to questions on a social network. For example, suppose a user posts the question "where can I buy good Indian food in Portland, Oreg.?" Users familiar with the area may respond to the question listing some of their favorite Indian restaurants. The QA robot captures the question and the posted answers. The captured information is analyzed to determine how often a particular restaurant is listed among the answers. If a restaurant is listed several times by several different users, the QA robot captures that information and can deduce that that particular restaurant may be a good answer to the question.

Moreover, if the user who posted the question later returns and indicates (e.g., by giving a thumb up or down to the answer, rating the answer on a scale of 1-10, etc.) that the suggestion was wonderful, then the QA robot gains even more confidence in the answer so that the next time a user asks for good Indian food in Portland the QA robot can retrieve and display the listed restaurant. As an additional benefit, the QA robot can give credibility points to the users that answered the question so that their answers (both previous and subsequent ones) are given more weight in later analyses of questions.

Similarly, if the user who posted the question returns and indicates he hated the suggestions, then the QA robot takes that into consideration in determining how to answer subsequent questions. For example, the QA robot may take credibility points away from the users that recommended the restaurant (and give less weight to their other answers). Especially, if other users chime in later saying they did not like the restaurant. Once enough users express dissatisfaction with the restaurant, the QA robot may add the restaurant to a list of restaurants to avoid. Then if a subsequent user asks what Indian restaurants to avoid, the QA robot has at least one answer available. In this way, over time, the QA robot can learn how to respond to questions.

In other embodiment, the QA robot may take a user's profile into account when determining an answer. For example, based on a user's browsing habits and age, the QA robot may be able to further customize the type of answers that are presented to a user. For example, suppose a search engine associated with a QA robot detects that a user performs frequent searches related to the "San Francisco 49ers". Subsequently, the user accesses the QA robot and asks "how much are football tickets?". Based on the user's search history, the QA robot can customize the answer and show the ticket prices for a San Francisco 49ers game.

In addition to collecting information from other users, answers can be derived from encyclopedia-type references (e.g., dictionaries, online encyclopedias, etc.). Hence, when a user asks a question about the population of Rhode Island, the QA robot simply retrieves that answer from other online resources.

Other sources of answers can include online reviews, blogs, and search engines. Search engine in particular can be useful since they are already designed to retrieve data. For example, suppose a user asks a question about a recent tornado. The search engine associated with the QA robot generates search results related to the event, including hyperlinks to relevant newspaper articles. In one embodiment, the QA robot may use abstracts or summaries of the newspaper articles to answer the question. The QA robot may also include hyperlinks to the articles in its answer.

Correct Answers

A QA robot generates answers to questions, but there may be times that more than one answer may be applicable to a question. In one embodiment, the QA robot analyzes candidate answers to determine the most "correct" answer (e.g., the answer most likely to be correct answer). In the case of non-subjective data, a correct answer can be relatively easy to find, assuming there is an authoritative answer to the question. For example, a user asks who wrote the book "Tale of Two Cities". In one embodiment, the QA robot can find the information relatively easily in a database that stores informational data.

In the case of subjective information, the answers are more difficult to determine. For example, suppose a user would like to know who the greatest classical composer of all-time is. Hence, he asks a QA robot the question, "who is the greatest composer of all-time?". Note that the question does not specify time period or music genre. So from the outset, the QA robot has to make certain assumptions based on its observations of user behavior. For example, here, the use of the term "composer" may be sufficient to indicate that the user would like to know which classical composer is the greatest of all-time, since it has observed that users typically refer to classical music writers as "composers" and musicians of other music genres as musicians or songwriters.

Based on that deduction, the QA robot searches its knowledgebase to find any previous information on classical music composers. Assume, for this example, that a previous question was asked that was similar to this one. The QA robot observed that there were many differing opinions as to who was the greatest composer of all-time was. In such a case, the collective opinions are combined using any of a number of heuristics to determine the correct answer.

For example, the correct answer to the question may be based on a simple majority vote. If a majority of users listed one particular composer as the best, then that composer is the most correct answer. Alternatively, the correct answer may be decided based on which composer receives the most number of votes. To illustrate, suppose Mozart received 25% of the vote, Beethoven received 15% of the vote, and several other composers received smaller percentages. In this scenario, Mozart is the most correct answer according to this heuristic since he has the highest total number of votes.

In yet other embodiments, expert opinions (e.g., from newspapers, music reviewers, online music stores, and audiophiles) may be solicited. Their response (or combined responses if more than one expert opinion is solicited) may be deemed as the most correct answer. In further embodiments, the combined analysis of expert and user opinions may be used. Finally, in one embodiment, a different set of heuristics may be used to identify the most correct answer.

Question Analyzer

Referring to FIG. 1, in one embodiment, question analyzer 110 is a component of QA robot system 100. Alternatively, it may be a software tool separate from QA robot system 100. Question analyzer 110 receives as input question 101, analyzes the question, and outputs either a candidate answer 115 or a set of features 118 associated with the question. The set of features are routed to QA answer component 120.

In one embodiment, question analyzer includes several sub-components to analyze and route questions to the proper QA expert in QA answer component 120. Those sub-components include feature extractor 111, router 112, and cache knowledgebase 113.

Feature Extractor

According to one embodiment, the process of analyzing question 101 to extract key features is performed by feature extractor 111. According to one embodiment, feature extractor 111 is a software tool that uses natural language parsing algorithms to parse questions submitted by users. A detailed discussion of the algorithms used for natural language parsing is beyond the scope of this disclosure. Briefly, however, natural language parsers parse input received from a user (e.g., questions, sentences, etc.) into a set of features. Feature extractor 111 identifies features in a question by comparing the words in question 101 to elements of a defined grammar for the QA robot. For example, feature extractor 111 defines a grammar that is comprised of a set of template questions. To parse question 101, feature extractor 111 matches question 101 to one of the template questions in the grammar. For example, feature extractor 111 determines what question word is used (e.g., "who", "what", "where", "why", or "how"), what other template keywords may be listed in the question, what names of people or places are in the question etc. Feature extractor 111 then compares those words to the question templates in the grammar, until it finds a matching question template. Then, feature extractor 111 extracts those features in the question that are important. In one embodiment, the important features are those elements in the template that need to be filled in.

To illustrate, suppose feature extractor 111 includes a question template that looks for questions in the following format:

| Template 1 |
| --- |
| "What" * <<MODE OF TRANSPORTATION >> * "from" <<CITY1>> "to" <<CITY2>> at <<TIME>>, where * is a wild card character that means there may or may not be intervening words between template features, MODE OF TRANSPORTATION refers to any of mode of transportation (e.g., "train", "taxi", or "airplane"), CITY1 and CITY2 refer to the names of cities, and TIME is the departure time. |

The important features of Template 1 (and their labels) are the words set off by "<<" and ">>" (e.g., mode of transportation, city1, city2, and time). When QA robot system 100 captures a question like "What train should I take to get from San Jose to San Francisco at 9:00 a.m.?" and forwards it to QA analyzer 110, feature extractor 111 receives the question, consults its grammar, determines that the question is parsable because it is in a similar format to that of Template 1, and extracts the important features in the question. The following table illustrates the result:

TABLE 1

| Feature label: | Part of Question that Matches the Feature: |
| --- | --- |
| MODE OF TRANSPORTATION | Train |
| CITY1 | To San Jose |
| CITY2 | From San Francisco |
| TIME | 9:00 a.m. |

The other information in the question, such as "should I take" and "What", are ignored since they are not part of the important features in this template. Note that Template 1 is a merely one example of a type of a template that feature extractor 111 may use to analyze questions. In other embodiments, different templates and different parsing mechanisms may be used to extract question features.

Once feature extractor 111 has extracted features from question 101, those features are used to determine how to route the question. So feature extractor 111 forwards the set of extracted features to feature router 112 so the question can be routed to a QA expert in QA answer component 120 that can answer the question.

Feature Router

Feature router 112, in one embodiment, is a software tool that receives the set of features output by feature extractor 111 and uses those features to determine to which QA expert in QA answer component 120 it should send the question. Feature router 112 implements any of a number of set routing algorithms to determine which QA expert in QA answer component is most appropriate to answer a given question.

For example, feature router 112 may use pattern recognition classifiers to determine where to send a question. To do so, feature router 112 examines the set of features extracted by feature extractor 111 and compares the feature labels and the data associated with the labels to indexed classifiers. If the feature labels match the classifiers for a particular QA expert, the question is forwarded to that QA expert in QA answer component 120. Note that there does not necessarily need to be a one to one correspondence between features and classifiers in this comparison. In one embodiment, the comparison between feature labels and classifiers may be ranked to determine which QA expert comes closest to matching the question features. These ranking can be weighted on the type of features in the question, how important a particular feature is, who asked the question, which QA experts are busiest, etc.

In other embodiment, linear matrices, support vector machines, Gaussian models, and other routing algorithms may be used to route questions.

When QA robot system 100 is first initialized it may take some time to learn where to route information. Accordingly, in a supervised training phase, a user may have to manually classify and route questions to QA experts in QA answer component 120 until system can do it on its own. To illustrate, suppose system 100 has access to large store of archived questions and answers derived from a social network. To train feature router 112, a user classifies a question. He may do this by determining the question's important features, adding a new question template to the question analyzer's grammar, and then adding classifiers to feature router 112's index so that questions with the extracted features are routed to a particular QA expert. The next time QA robot system 100 encounters a question with the same (or similar) features, it can be forwarded to the same expert.

Furthermore, during the training phase (and beyond), the user can teach system 100 where not to send questions. For example, suppose system 100 gets a car-related question that should be forwarded to a QA expert on cars, so the user routes the question appropriately. At the same time, the user can also indicate that car-related questions should never be sent to the QA expert on interior design. Hence, the process of training feature router 112 may involve providing it with proper examples of routing and counter-examples.

According to one embodiment, feature router 112 may filter questions that QA robot system 100 is unable to answer. For example, suppose system 100 receives a question for which there is no expert. In such a case, feature router 112 might send the question to a set of human experts to be answered, or it may tell the system to notify the user that the question cannot be answered by QA answer component 120. Similarly, if a user posts questions with irrelevant, offensive, or other bad information in it, feature router 112 may simply throw the question out. Alternatively, the user may be prompted by system 100 to clarify the question or provide additional information.

Cache Knowledgebase

Cache knowledgebase 113, according to one embodiment, is a data repository that includes well-defined answers to commonly asked questions. For example, suppose the question "What is the White House's address?" is commonly asked by users. In one embodiment, system 100 develops a good answer that includes the White House's address, pictures of the White House, links to historical information about it, and other information users have found interesting in the past when searching for information about the White House. That information is stored in cache knowledgebase 113 so it can be quickly accessed the next time a user requests that information.

In one embodiment, in addition to being well-defined, the answers in cache knowledgebase 113 also are answers to questions that system 100 can identify with a high degree of certainty. To illustrate, in the example above, when the user inputs the question, "What is the address of the White House?", feature router 112 may determine that there is a very high correspondence between features in the question and terms in the cache knowledgebase index. Accordingly, this candidate answer 115 is forwarded to the confidence engine. Alternatively, system 100 may simply display the answer to the user.

Although, only one data repository has been described, it should be noted that the information contained in cache knowledgebase 113 can be separated into more repositories or combined other repositories.

QA Answer Component

In one embodiment, QA answer component 120 is a component of QA robot system 100. Alternatively, it may be a software tool separate from QA robot system 100. QA answer component 120 receives as a set of features 118 from question analyzer 110, analyzes the features to determine what information the user is looking for, and outputs candidate answer 115. Candidate answer 115 can include a single answer provided by a QA expert, or it may include multiple candidate answers if more than one answer is probable.

In one embodiment, QA answer component 120 can refer to a single QA expert that answers questions on a wide range of topics or it can refer to a set of QA experts (e.g., e1 121, e2 122, e3 123, and e4 124) that answer questions based on the question's subject matter. For example, e1 121 may be a QA expert that answers questions related to science, e2 122 answers music questions, e3 123 answers questions about travel, and e4 124 answers food questions.

In one embodiment, e1 121, e2 122, e3 123, and e4 124 each have a corresponding knowledgebase (e.g., k1 125, k2 126, k3 127, and k4 128 respectively) that includes answers to questions on the topics each QA expert specializes in. These knowledgebases are similar to the cache knowledgebase described above in the sense that they are repositories of collected answers indexed on classifiers and/or features.

For example, when e1 121 receives a routed question with extracted features from question analyzer 110, e1 121 matches the extracted features 118 to indexed classifiers of k1 125. Based on how closely the features and index classifiers match, e1 selects one or more candidate answers 115 to send to confidence engine 130.

It should be noted that, although, FIG. 1 illustrates four QA experts in QA answer component 120, more QA experts could be added to cover a wider range of topics. In addition, specialized QA expert could be added that answer questions about particular areas or regions of the world, and so forth. In this way, the number of QA experts in QA answer component 120 could be large depending on how it is implemented.

QA experts e1 121, e2 122, e3 123, and e4 124 as noted above may need to be trained initially before they can start answering questions. For example, initially, the QA experts may simply memorize the best answers (e.g., store questions and the most highly rated answers associated with the questions). Then when the same or very similar question is posed later to system 100, the QA expert simply regurgitates the best answer it has stored. Over time the QA experts refine their answers as it obtains more data as described below.

In this way, QA answer component 120 may start out answering a very small percentage of the questions asked, but as its knowledgebases increase, the number of questions it answers also increases.

Confidence Engine

In one embodiment, confidence engine 130 is a component of QA robot system 100. Alternatively, it may be a software tool separate from QA robot system 100. Confidence engine 130 receives candidate answer 115 from either question analyzer 110 or QA answer component 120 and determines an overall confidence value for candidate answer 115. Confidence engine 130 takes into various confidence measures to determine the overall confidence value that a candidate answer 115 is a correct answer.

For example, the overall confidence value for each candidate answer may take into account a confidence value that the question was routed to the correct QA expert in QA answer component 120, a confidence level value that the correct features were extracted from question 101 by feature extractor 111, and a confidence level value that QA expert chose the correct answer. The confidence levels at each step of the process may be determined in a variety of ways.

For example, the confidence level that the correct features were extracted may involve comparing the number of features extracted from question 101 to the number of features in a question template. Moreover, specific features of the question may be weighted differently than others. For example, in the question above, "What train should I take to get from San Jose to San Francisco at 9:00 a.m.?", the fact that the question minors the question template would indicate that the correct features were identified. Moreover, the fact that the question lists valid cities, a valid time, a valid mode of transportation would only increase that confidence value.

Feature router 112 found classifiers that matched each of the extracted features (e.g., a QA expert includes index classifiers for "train", "to San Francisco", "from San Jose", etc.). Hence, the confidence level that the question was routed properly is also high.

A similar evaluation can be made of the QA expert where the question was routed, for example, how extensive is the underlying database, how much information is stored on that particular topic, etc. Based on these factors, confidence engine 130 determines an overall confidence level for each candidate answer 115 and sends the answer to decision maker 140.

In other implementations, confidence engine 130 may determine the overall confidence value of a candidate answer in some other way.

Decision Maker

In one embodiment, decision maker 140 is a component of QA robot system 100. Alternatively, it may be a software tool separate from QA robot system 100. Decision maker 140 receives one or more candidate answers 115 from confidence engine 130 and the overall confidence value that confidence engine 130 computed for each candidate answer. Decision maker 140 evaluates the overall confidence levels and determines whether or not the confidence level(s) meet a particular threshold. If the overall confidence level of a candidate answer meets or exceeds the threshold, then the candidate answer 115 is added to the list of answers to be displayed to the user as an answer to question 101.

In one embodiment, the threshold used by decision maker 140 may vary depending on user expectation and the type of question being asked. For example, if a user asks a question about a train schedule, then the user typically expects an answer that is correct. Similarly, if a user asks a question about a known fact such as the name of the state capital of Texas, then again the user would expect the answer to be correct. Thus, the threshold to display non-subjective data is likely to be higher than the threshold for displaying subjective information.

Moreover, the threshold may change as system 100 gains a wider body of knowledge. Initially, system 100 may want to post high precision answers on a very select number of questions while it learns the best format to answer questions and builds its knowledgebases. Then as system 100 learns and adapts, the threshold may change, particularly, as system 100 identifies what a good answer is and what users expect in an answer.

In one embodiment, when a candidate answer 115 does not exceed the confidence level threshold determined by decision maker 140, question 101 and the suggested answer can be sent to human experts 150 to be answered. Human experts can generally refer to a human expert on a particular topic, a panel of experts, a group of computer users, or any other type of human input that can answer the question. In one embodiment, the resulting answer may also be subject to certain thresholds (e.g., analysis may be performed to determine which human expert answered the question and how reliable has the human expert been in the past).

When answers, either a candidate answer 115 or an answer from human experts 150, exceed the confidence level threshold, it is added to the list of answers that is displayed to the user. In one embodiment, if more than one answer exceeds the threshold, when the answers are displayed they are sorted and ranked according to the overall confidence level of each answer.

In the end, decision maker 140 displays the list of answers 145 to the user who posed the question.

Display the Answer

In one embodiment, the list of answers 145 derived by decision maker 140 is displayed on the same social network where question 101 was posed. The list of answers may include one answer or many answers. According to one embodiment, the list of answers is further enhanced by compiling and displaying answers submitted by other users. In this way, the user who asked the question is presented with multiple answers. In one embodiment, the user has to access the social network (e.g., through a web browser) to view the answers.

The actual ordering and number of answers displayed to the user on the social network varies based on implementation. In one embodiment, the user can selectively choose how many answers they would like to see. For example, the social network may include controls that allow the user to choose how many answers are displayed in the social network's display interface. Moreover, the social network display interface may allow the user to select what type of answers is displayed. For example, the user may only want answers from highly rated users or answers that have a high likelihood of being correct. Accordingly, the user is provided with controls that allow him to select these types of features.

In one embodiment, the answer can be sent to an email address, text message number, or other communication device.

Adjudicator

In one embodiment, adjudicator 150 is a component of QA robot system 100. Alternatively, it may be a software tool separate from QA robot system 100. Adjudicator 150 collects user input ("votes") 148 that rates answers given to users After list of answers 145 is displayed to a user, adjudicator 150 collects votes 148 from users on the quality of the answers. Vote 148 refers to the input received as users rate an answer. A user interface control accessible through the social network allows users to vote. For example, next to each answer in the list of answers, system 100 may display a "thumbs up" or "thumbs down" icon, which allows user to vote on the answer. Alternatively, the user interface control may be a smiley face and a frowny face, a scale from 1-10, five stars, etc.

When users vote on an answer, each vote 148 is sent to adjudicator 150, which compiles the votes into a vote tally. The vote tally includes votes for each rated answer in list of answers 145. In one embodiment, the answers with the highest number of votes are ranked and ordered. The highest rated answers (e.g., the top 3, top 5, top 10, or even more) are then forwarded to feedback analyzer 160 in order to refine system 100. Note that the highest rated answers do not necessarily need to include any answers generated by system 100.

Feedback Analyzer

In one embodiment, feedback analyzer 160 is a component of QA robot system 100. Alternatively, it may be a software tool separate from QA robot system 100. Feedback analyzer 160 receives the list of highest rated answers 155 from adjudicator 150 and uses those answers to further refine its own ability to answer questions. In other words, feedback analyzer 160 is an adaptation component that analyzes answers to see what went right and wrong while answering a question. In other words, if the list of highest rated answers does not include the answer provided by system 100, feedback analyzer 160 attempts to determine where the system erred.

In one embodiment, feedback analyzer 160 examines the characteristics of the highest rated questions to determine where system 100's answer went wrong. Because, even if system 100 provided a technically correct answer, but it is not among the highest rated answers, system 100 looks for ways to adapt so its next answer resembles the best answers.

For example, suppose the highest rated answers on the social network are short (e.g., less than 200 words). Feedback analyzer 160 observes this characteristic and adapts the way system 100 answers questions. The next time a question is asked and the system is choosing between a 500-word answer and a 180-word answer, the system selects the shorter one. Similarly, if the best answers consistently include hyperlinks to external resources, feedback analyzer 160 detects this characteristic and feeds that information to the QA experts. In subsequent answers, system 100 then includes (to the best of its abilities) a hyperlink to an external resource in its answers.

Another example, feedback analyzer 160 may compare keywords in question 101 to keywords in the answers to refine the way it routes questions. In addition, the best answers also provide feedback analyzer 160 with additional information to store in its knowledgebases.

In one embodiment, feedback analyzer 160 may keep track how particular users vote (e.g., what type of answers the user likes). Over time, as the user asks questions and rates answers, the answer provided by system 100 can be adapted to the individual. Similarly, questions and answers can be adapted over time for groups.

In this way, feedback analyzer 160 helps QA robot system 100 emulate not just the information that the other users provide, but also emulates the style in which the information is presented to the user.

Procedure for Learning from Question and Answering Network of Humans

Figure 2:
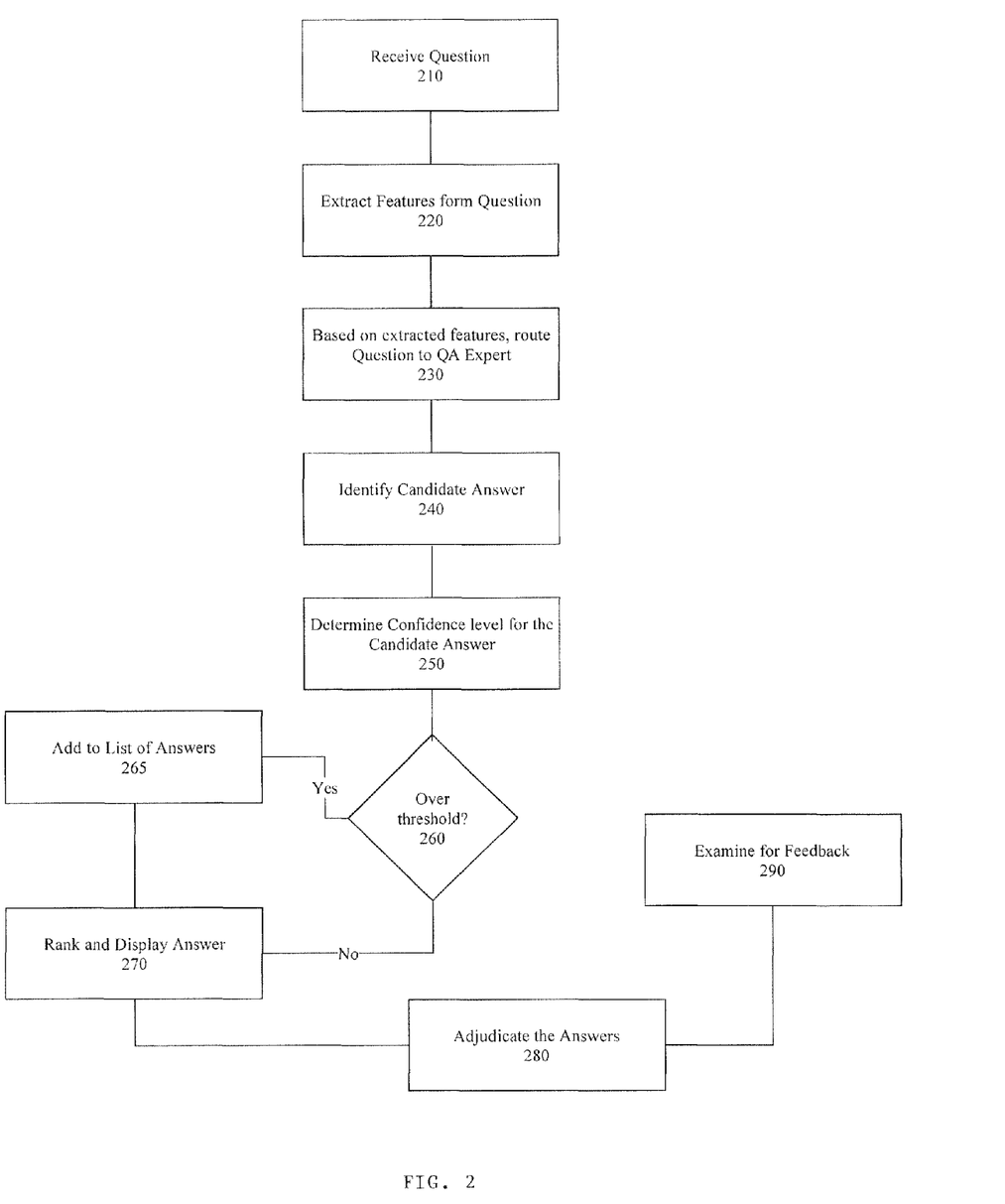
FIG. 2 illustrates an example flowchart illustrating the procedure for collecting and refining the way a question and answer system responds to questions, according to an embodiment of the invention.
Figure 3:
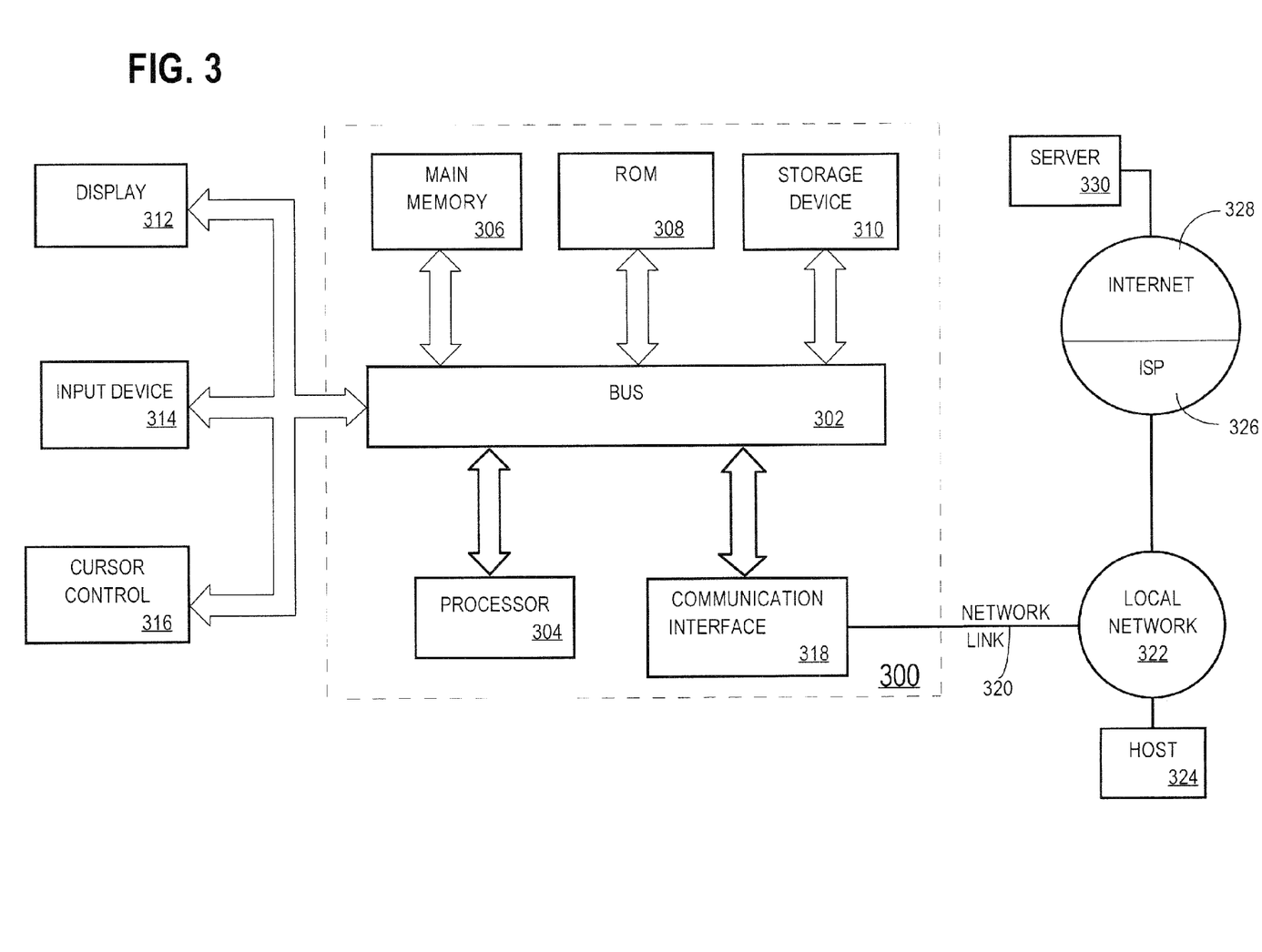
FIG. 3 is a block diagram of a computer system on which implementations of the present invention may be implemented.

FIG. 2 illustrates a procedure 200 for collecting, refining, and displaying answers to users through a QA robot system. To illustrate procedure 200, consider the example of George. George is a typical computer-user who wants to see a movie over the upcoming weekend and would like suggestions about what movie he should see. George is a member of an online message board that often discusses movies, so he accesses the Internet through a web browser in order to post his question. The message board George frequent includes a QA robot, such as system 100 described above, that answers questions posted on the board just like other users do. Assume QA robot has a movie QA expert that has been sufficiently trained to answer many of the questions asked it.

After George navigates to the message board, he starts a new thread where he asks "what action movie should I go to this weekend?" and submits the question to the board. Soon thereafter, his question is displayed on screen. At step 210, the QA robot associated with the message board detects that a question has just been posted. Accordingly, QA robot captures the question in order to analyze and an answer it. The analysis of the question begins at step 220. At step 220, the question is examined to see if it is a valid question (e.g., that it conforms to the QA robot's grammar) and, if so, features of the question are extracted. Assume that the question is valid and conforms generally to the grammar. Thus, in one embodiment, the question features are extracted by a feature extractor like feature extractor 111 described above.

Extracting the features involves identifying the important features of the question. In this case, the important features may include "action", "movie", and "weekend". In other embodiments, some of the other features may be important as well, but for this example those items are the key features. However, assume for this example that the QA robot has not yet encountered the keyword "weekend" before. Since, it does not know what to do with that word, the QA robot throws it out. Thus, only "action" and "movie" are used to answer the question.

At step 230, the extracted features are used to determine where to route the question in the QA robot (e.g., which QA expert can handle the question). In one embodiment, the routing is performed by a feature router like feature router 112 described above. As QA robot examines the keywords it determines that keyword "movie" indicates that the topic of the question is movies. Accordingly, QA robot routes the question (or at least the extracted features of the question) to its movie QA expert. When the movie QA expert receives the question, it notices that the question includes the keyword "action". In one embodiment, the movie QA expert routes the question to an even more specialized QA expert that specializes in answering questions about action movies.

At step 240, the QA expert identifies an answer to the question as it understands it. In one embodiment, a QA answer component like QA answer component 120 may be used to find the answer. According to one embodiment, the QA robot consults previous questions that include the words "action" and "movie" and identifies a number of answers that fit the profile. The QA robot selects the most popular one. In this example, the answer lists the "top ten action movies of all-time". The QA robot designates that answer as the candidate answer to the question.

At step 250, the QA robot computes an overall confidence value for the answer. In one embodiment, a confidence engine such as confidence engine 130 computes the overall confidence value. Since only two features were extracted from the question, the system's confidence that it was routed correctly is not high. In addition, a number of answers in the QA expert's knowledgebase were identified as possible answers. This lowers the confidence level even more since the answer may have been any one of the other non-selected answers. In the end, the overall confidence score is relatively low.

At step 260, a decision is made whether or not the confidence score is high enough to justify sending the answer to George. In some cases, the answer probably would not be shown, but in this case since the question relates to movies (subjective information), the threshold for displaying it is not very high. Thus, at step 265, the answer is added to the list of answers displayed in response to the George's question. If the confidence level had been below the threshold, in one embodiment, the QA robot would not have submitted an answer, but would have observed the other answers to learn how refine its own ability to answer the question the next time someone posts it.

At step 270, the list of answers is displayed to the George. The list can include answers from other users that access the message board, from online reviews, online movie experts, and others, in addition to the QA robot's answer.

Once George sees the answers, he reads through them and picks one of the recommended movies submitted by a user named Larry to see over the weekend. That weekend, George goes to the theater and watches the recommended movie and absolutely loves it. The next day he accesses the message board and gives Larry a big thanks and huge thumbs up for his recommendation. He also gives several other users who recommended the same movie thumbs up for recommending it as well.

At step 280, the QA robot detects the huge thumbs up George gave to Larry and the other thumbs up he gave to other users. In one embodiment, an adjudicator component of the QA robot like adjudicator 150 described above detects the votes submitted by George. The QA robot compiles those answers so they can be analyzed.

At step 290, the best answers are examined to see what characteristics they have that the QA robot's answer did not. In one embodiment, this analysis is performed by a feedback analyzer like feedback analyzer 160 described above. Suppose that Larry's answer includes a recommendation for a movie that would open that weekend. Larry's answer also includes links to a trailer for the movie, a link to an online review of the movie, and some general plot points and times to see the move.

The QA robot analyzes the question and notices that Larry's answer contains the keyword "weekend". Feedback analysis may deduce that this word is important for movie questions. Accordingly, the QA robot may update its grammar to look for the word "weekend". By doing so, the routing information can also be updated. Thus, whenever a movie question appears that has the word "weekend", the QA robot may try to answer the question in the same way Larry did.

Another characteristic that the QA robot may detect is that the recommended movie is a movie still in theaters. Thus, the QA robot may deduce that the word "weekend" may indicate that the user would like to go to the theater. Other characteristics include the link to the trailer, the online movie review link, and the plot points. If QA robot notices over time that other answers with similar types of information are consistently rated high, then it will adapt to emulate this type of answer.

In one embodiment, the list of best answers is stored by QA robot so that when a subsequent user asks a similar question, it can respond with a better answer. In this way, automated answers can be enhanced and refined to include a wider range of data.

Hardware Overview

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one implementation of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method comprising:
   extracting, by a question answering (QA) system, a set of features from a current question;
   performing, by the QA system, a comparison between (a) said set of features from said current question and (b) a set of features from one or more previously-submitted questions;
   selecting, based on the comparison, an answer to said current question from a set of answers to said one or more previously-submitted questions;
   displaying said answer in conjunction with a set of user-submitted answers to said current question;
   receiving user input that rates at least one user-submitted answer of said user-submitted answers higher than said answer;
   identifying one or more characteristics of the at least one user-submitted answer that are different from said answer;
   based on the one or more characteristics, modifying one or more elements of the QA system; and
   wherein the method is performed by one or more computing devices.

2. The method of claim 1, wherein extracting said set of features includes:
   matching the current question to an element in a grammar; and
   based on the features defined in the element in the grammar, extracting features from the current question.

3. The method of claim 2, wherein the element in the grammar is a question template.

4. The method of claim 1, wherein performing the comparison includes comparing the set of features from the current question to a set of index values associated with a knowledgebase of said QA system.

5. The method of claim 1, wherein selecting an answer to said current question from said set of answers includes:
   computing a confidence value for the answer; and
   determining if said confidence value exceeds a specified threshold.

6. The method of claim 5, wherein the answer is displayed in conjunction with said set of user-submitted answers only if the confidence value exceeds a specified threshold.

7. The method of claim 1, wherein receiving user input that rates at least one user-submitted answer of said user-submitted answers higher than said answer includes receiving user input that indicates a score for the at least one user-submitted answer and said answer.

8. The method of claim 1, further comprising adding said at least one user submitted answer to a knowledge store.

9. The method of claim 1, wherein:
   the one or more elements of the QA system include a QA router that, for each question of a plurality of questions, routes said each question, based on features extracted from said each question, to one of a plurality of QA experts; and
   modifying the one or more elements of the QA system includes modifying routing information of the QA router.

10. The method of claim 1, wherein:
    the one or more elements of the QA system include a grammar that comprises a set of template questions; and
    modifying one or more elements of the QA system includes modifying at least one template question from the set of template questions.

11. The method of claim 1, wherein:
    the one or more elements of the QA system include a plurality of QA experts, each of which is configured to select an answer to a given question; and
    modifying one or more elements of the QA system includes modifying information used by one or more of the plurality of QA experts to answer subsequent questions.

12. One or more machine-readable storage medium storing instructions which, when executed by one or more processors, cause the performance of:
    extracting, by a question answering (QA) system, a set of features from a current question;

performing, by the QA system, a comparison between (a) said set of features from said current question and (b) a set of features from one or more previously-submitted questions;

selecting, based on the comparison, an answer to said current question from a set of answers to said one or more previously-submitted questions;

displaying said answer in conjunction with a set of user-submitted answers to said current question;

receiving user input that rates at least one user-submitted answer of said user-submitted answers higher than said answer;

identifying one or more characteristics of the at least one user-submitted answer that are different from said answer; and based on the one or more characteristics, modifying one or more elements of the QA system.

13. The one or more machine-readable storage media of claim 12, wherein extracting said set of features includes:

matching the current question to an element in a grammar; and based on the features defined in the element in the grammar, extracting features from the current question.

14. The one or more machine-readable storage media of claim 13, wherein the element in the grammar is a question template.

15. The one or more machine-readable storage media of claim 12, wherein performing the comparison includes comparing the set of features from the current question to a set of index values associated with a knowledgebase of said question answering component.

16. The one or more machine-readable storage media of claim 12, wherein selecting an answer to said current question from said set of answers includes:

computing a confidence value for the answer; and determining if said confidence value exceeds a specified threshold.

17. The one or more machine-readable storage media of claim 16, wherein the answer is displayed in conjunction with said set of user-submitted answers only if the confidence value exceeds a specified threshold.

18. The one or more machine-readable storage media of claim 12, wherein receiving user input that rates at least one user-submitted answer of said user-submitted answers higher than said answer includes receiving user input that indicates a score for the at least one user-submitted answer and said answer.

19. The one or more machine-readable storage media of claim 12, wherein the instructions, when executed by the one or more processors, further cause adding said at least one user-submitted answer to a knowledge store.

20. The one or more machine-readable storage media of claim 12, wherein:

the one or more elements of the QA system include a QA router that, for each question of a plurality of questions, routes said each question, based on features extracted from said each question, to one of a plurality of QA experts; and modifying the one or more elements of the QA system includes modifying routing information of the QA router.

21. The one or more machine-readable storage media of claim 12, wherein:

the one or more elements of the QA system include a grammar that comprises a set of template questions; and modifying one or more elements of the QA system includes modifying at least one template question from the set of template questions.

22. The one or more machine-readable storage media of claim 12, wherein:

the one or more elements of the QA system include a plurality of QA experts, each of which is configured to select an answer to a given question; and modifying one or more elements of the QA system includes modifying information used by one or more of the plurality of QA experts to answer subsequent questions.

* * * * *